(12) United States Patent
Cavaliere et al.

(10) Patent No.: US 12,185,036 B2
(45) Date of Patent: Dec. 31, 2024

(54) METHOD AND APPARATUS FOR CONTROLLING TRANSMISSION OF AN UPSTREAM PACKET TRAFFIC IN A TDM PON-BASED FRONTHAUL

(71) Applicant: Telefonaktiebolaget LM Ericsson (PUBL), Stockholm (SE)

(72) Inventors: Fabio Cavaliere, Pisa (IT); Stefano Ruffini, Pisa (IT); Peter Olanders, Taby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 365 days.

(21) Appl. No.: 17/607,244

(22) PCT Filed: Apr. 29, 2019

(86) PCT No.: PCT/EP2019/060971
§ 371 (c)(1),
(2) Date: Oct. 28, 2021

(87) PCT Pub. No.: WO2020/221430
PCT Pub. Date: Nov. 5, 2020

(65) Prior Publication Data
US 2022/0224998 A1   Jul. 14, 2022

(51) Int. Cl.
*H04Q 11/00* (2006.01)

(52) U.S. Cl.
CPC . *H04Q 11/0067* (2013.01); *H04Q 2011/0064* (2013.01)

(58) Field of Classification Search
CPC ............ H04Q 11/0067; H04Q 2011/0064
(Continued)

(56) References Cited

U.S. PATENT DOCUMENTS 10,009,673 B1 * 6/2018 Liu ............ H04W 88/085
2008/0089685 A1 * 4/2008 Kazawa ............ H04J 3/0682
398/66

(Continued)

FOREIGN PATENT DOCUMENTS

JP   2005012800 A * 1/2005 ......... H04Q 11/0067
JP   2018098651 A * 6/2018
(Continued)

OTHER PUBLICATIONS

Alexander Rylyakov et al., A 25 GB/s Burst-Mode Receiver for Low Latency Photonic Switch Networks, IEEE Journal of Solid-State Circuits, vol. 50, No. 12—Dec. 2015.
(Continued)

*Primary Examiner* — Abbas H Alagheband
(74) *Attorney, Agent, or Firm* — Baker Botts L.L.P.

(57) ABSTRACT

A method of controlling transmission of an upstream packet traffic from a plurality of Optical Network Units to an Optical Line Terminal in a Passive Optical Network based fronthaul network. The Optical Network Units transmit packets in a time division multiplexed access scheme to the Optical Line Terminal and the method comprises obtaining mobile upstream scheduling information, scheduling the packet traffic from the plurality of Optical Network Units based on delay constraints of the PON-based front haul network and the obtained mobile upstream scheduling information. The method also comprises transmitting the scheduling of the packet traffic to the plurality of ONUs.

19 Claims, 6 Drawing Sheets

(58) Field of Classification Search
USPC .......................................................... 398/168
See application file for complete search history.

(56) References Cited

U.S. PATENT DOCUMENTS

| | | | | |
|---|---|---|---|---|
| 2011/0142448 | A1* | 6/2011 | Zou ..................... | H04J 14/0201 |
| | | | | 398/58 |
| 2015/0311980 | A1* | 10/2015 | Kuwano .......... | H04B 10/25752 |
| | | | | 398/58 |
| 2017/0250777 | A1* | 8/2017 | Sarashina ......... | H04W 56/0015 |
| 2018/0070373 | A1* | 3/2018 | Muench ................ | H04W 72/52 |
| 2018/0076914 | A1* | 3/2018 | Zhou ................... | H04L 41/0836 |
| 2020/0028605 | A1* | 1/2020 | Uzawa .............. | H04W 72/0446 |
| 2020/0322052 | A1* | 10/2020 | Yigit ....................... | G06F 9/547 |

FOREIGN PATENT DOCUMENTS

| | | | | |
|---|---|---|---|---|
| WO | 99 03226 | A1 | 1/1999 | |
| WO | 2015 169363 | A1 | 11/2015 | |
| WO | WO-2017049429 | A1 * | 3/2017 | ............. H04B 10/00 |

OTHER PUBLICATIONS

ECPRI Specification v.1.0; Interface Specification; Common Public Radio Interface; eCPRI Interface Specification—Aug. 22, 2017.
Yu Nakayama et al., Efficient DWBA Algorithm for TWDM-PON with Mobile Fronthaul in 5G Networks—IEEE 2017.
Francois Fredricx et al., Source: Nokia, Title: Goal of Cooperative DBA interface, considerations for mobile front-haul—Apr. 15, 2018.
PCT Notification of Transmittal of the International Search Report and the Written Opoinion of the International Searching Authority, or the Declaration issued for International application No. PCT/EP2019/060971—Mar. 17, 2020.
Takayoshi Tashiro et al., A Novel DBA Scheme for TDM-PON based Mobile Fronthaul, Optical Society of America—2014.
Hiroyuki Uzawa et al., Practical Mobile-DBA Scheme Considering Data Arrival Period for 5G Mobile Fronthaul with TDM-PON, NTT Access Network Service Systems Laboratories, IEEE—2017.
Hiromu Sato et al., Reducing Uplink Transmission Latency for Applying TDM-PON to Mobile Fronthaul, Information Technology R&D Center, Mitsubishi Electric Corporation—Sep. 2018.
Francois Fredricx et al., Source: Nokia, Title: Specification of Cooperative DBA interface—Apr. 17, 2018.

* cited by examiner

METHOD AND APPARATUS FOR CONTROLLING TRANSMISSION OF AN UPSTREAM PACKET TRAFFIC IN A TDM PON-BASED FRONTHAUL

PRIORITY

This nonprovisional application is a U.S. National Stage Filing under 35 U.S.C. § 371 of International Patent Application Serial No. PCT/EP2019/060971 filed Apr. 29, 2019 and entitled "METHOD AND APPARATUS FOR CONTROLLING TRANSMISSION OF AN UPSTREAM PACKET TRAFFIC IN A TDM PON-BASED FRONTHAUL" which is hereby incorporated by reference in its entirety.

TECHNICAL FIELD

The present invention relates to fronthaul networks based on Passive Optical Networks, in general, and in particular to controlling transmission of an upstream packet traffic in a PON-based fronthaul network.

BACKGROUND

Passive optical networks, PON, standardized by IEEE (E-PON) and ITU-T (G-PON) are a widespread fixed wireline access solution, providing 2.5 Gbit/s of symmetric speed. Other PON standards were added later to support higher capacities: for example, XGS-PON and NG-PON2, standardized by ITU-T, work at 10 and 40 Gbit/s in downstream, respectively, and at 10 Gbit/s in upstream. In downstream, NG-PON2 uses four multiplexed wavelengths, modulated at 10 Gbit/s. In all PON implementations, downstream and upstream bandwidth is allocated by means of Time Division Multiplexing (TDM) and TDM Access (TDMA), respectively. In downstream, a constant bit rate signal is broadcast from an Optical Line Terminal (OLT), 102, to a number of Optical Network Units (ONUs), 104, through an Optical Distribution Network (ODN), 106, consisting of a trunk fibre, 108, a passive optical splitter, 110, and drop fibres, 112, connected to the ONU, as illustrated in FIG. 1. ONU is also sometimes referred to as Optical Network Terminal (ONT). In the upstream direction the ONUs are coordinated by the OLT, 102, which assigns to individual ONU, 104, a time window in which the ONU is allowed to transmit. The assignment process is known as Dynamic Bandwidth Assignment (DBA). The OLT, 102, is usually located centrally within a network (or its part) and this location is usually referred to as a Central Office (CO). There may be more than one Central Office in a network. The ONU devices, 104, are located remotely from the OLT, 102, and close to the end user/subscriber. In some embodiments the ONU may be located in customer premises and thus providing access to the network over optical fibre up to the CPE (customer premises equipment). Alternatively, the ONU may be located in street cabinets or on lamp posts and from there the access is provided to the customer over copper wires, usually using xDSL technologies like VDSL2 of G.fast.

In a split radio architecture, the functionalities of the base station are separated in two equipment units: Remote Unit (RU), 114, sometimes also referred to as Remote Radio Unit (RRU) or Remote Radio Head (RRH) which performs low layer functions of the radio protocol stack, and Base Band processing Unit (BBU), 116, sometimes also referred to Central Unit (CU), in charge of upper layer functions of the radio protocol stack not performed by the RU, 114. The link or the interface between the two units is called fronthaul and it is the span of the network between FH interfaces illustrated in FIG. 1. The RU has smaller footprint and smaller energy consumption compared to a complete base station. Further resource optimization can be achieved by pooling more BBUs in a single site serving several RUs, a scenario referred as centralized Radio Access Network (CRAN). The acronym CRAN may also be interpreted as Cloud RAN, which refers to the centralized scenario where baseband and control functionalities are partly virtualized.

Reusing installed fibre infrastructure of existing PON networks without deploying new cables is the most immediate reason for transporting fronthaul interfaces over PON. When a PON network is used for fronthaul in a wireless mobile network an RU, 114, (or more than one RU) is connected to the ONU, 104, and a BBU, 116, (or more than one BBU) is connected to the OLT, 102.

Incumbent operators owning both wired and wireless networks have also interest in co-locating fixed access OLT, 102, and BBU, 116, in the same site, to save real estates and maintenance costs. Besides these practical aspects, service/network convergence (backhaul, fronthaul, enterprise, fixed access, etc.) in the same transport network, a scenario referred as Xhaul, and virtualization of network functions in a CRAN are often claimed by operators as other driving reasons.

However, TDM-based PON solutions cannot be directly used for fronthaul due to latency exceeding requirements of LTE and 5G network. In TDM-based PON networks implementing DBA for upstream transmission the latency is in the order of milliseconds, whereas in LTE the round-trip time between an eNodeB (eNB) and user equipment (UE) is specified to be 8 ms with the allowable latency below 1 ms.

In a known technique called co-operative DBA, or co-DBA the term cooperative refers to cooperation between mobile equipment (BBU and RU) and fixed access equipment (OLT and ONU). Taking as reference the upstream direction, when the UE sends a grant request at the instant $t_0$, the BBU approves it and schedules traffic transmission at the instant $t_0+T$, where the time interval T is sufficiently large to include propagation delay, BBU-OLT and RU-ONU communication times, and RAN scheduling time. This way the co-DBA mechanism allocates bandwidth for each ONU in the upstream direction based on upstream mobile scheduling information the BBU has from the approved grant requests. Co-DBA is a clever method, but it assumes the presence of external OLT and ONU, which are not strictly needed if the traffic is only fronthaul. In that case, all needed OLT and ONU functionalities may be embedded in the BBU and RU, respectively. One example of a basic feature to be included in the BBU is a scheduler operative to ensure that packets serving different RUs are properly aligned in the time-slots of the TDM frame, as is required by the PON network. This is an operation not performed by current BBUs, which most often are connected to the RUs by individual point-to-point (p2p) dedicated fibres.

A PON-based fronthaul infrastructure has its own challenges compared to a regular fronthaul installation where each RU is connected by its own dedicated fiber to the BBU. In the PON-based scenario a section of the same fiber is shared among multiple RUs and this adds latency because individual RU does not exclusively own the bandwidth, but rather time slots are allocated to the different RUs connected to this section of fibre. This means data packets from RUs must be queued before transmission over the optical fibre and must not overlap in time with packets from other RUs.

To some extent these challenges may be addressed by the so called cooperative dynamic bandwidth assignment algorithm (co-DBA) discussed above, where cooperative means that the mobile traffic scheduler (RAN scheduler) at the BBU and the OLT scheduler (PON scheduler), which is in charge of scheduling transmission of the ONUs associated with the RUs, must collaborate.

SUMMARY

It is the object of the present invention to obviate at least some of the above disadvantages and provide an improved solutions for controlling transmission of an upstream packet traffic in a PON-based fronthaul network.

Accordingly, the invention seeks to preferably mitigate, alleviate or eliminate one or more of the disadvantages mentioned above singly or in any combination.

According to a first aspect of the present invention there is provided a method of controlling transmission of an upstream packet traffic from a plurality of Optical Network Units, ONUs, connected to an Optical Line Terminal, OLT. The ONUs and the OLT operate in a Passive Optical Network, PON, based fronthaul network. The Optical Network Units transmit packets in a time division multiplexed access scheme to the OLT and the method comprises obtaining mobile upstream scheduling information and scheduling the packet traffic from the plurality of ONUs based on delay constraints of the PON-based fronthaul network and the obtained mobile upstream scheduling information. The method also comprises transmitting the scheduling of the packet traffic to the plurality of ONUs.

According to a second aspect of the present invention there is provided an apparatus for controlling transmission of an upstream packet traffic from a plurality of Optical Network Units, ONUs to an Optical Line Terminal, OLT. The ONUs are connected to the OLT in a Passive Optical Network, PON, based fronthaul network. The Optical Network Units transmit packets in a time division multiplexed access scheme to the OLT. The apparatus comprises a processing circuitry and a memory. The memory contains instructions executable by the processing circuitry such that the apparatus is operative to obtain mobile upstream scheduling information and to schedule the packet traffic from the plurality of ONUs based on delay constraints of the PON-based fronthaul network and the obtained mobile upstream scheduling information. The apparatus is also operative to transmit the scheduling of the packet traffic to the ONUs.

Further features of the present invention are as claimed in the dependent claims.

The present invention provides following advantages:
- reduction of delay to keep it below the maximum tolerated value,
- keeping the PON delay deterministic,
- maintaining the upstream transmission continuous and the optical power received at the OLT at a approximately constant level, this, in turn, allows for relaxing technical requirements for the burst mode receivers, or even completely dispense with the BMRs.

BRIEF DESCRIPTION OF THE DRAWINGS

The present invention will be understood and appreciated more fully from the following detailed description taken in conjunction with the drawings in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary details.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

Fronthaul (FH) interfaces were traditionally constant bit rate interfaces. Common Public Radio Interface (CPRI) is the most used fronthaul interfaces in 4G mobile networks. Its bit rate can be calculated by sampling the signal on air at the Nyquist rate (twice the signal bandwidth), digitizing it with a certain resolution (usually, 15 bits) and multiplying the result by the number of antenna ports. Overhead is added for line coding and rate matching. Such a way, a 20 MHz signal over two antenna ports generates a bit rate in fibre equal to 2.5 Gbit/s (2 Gbit/s not considering the 8b/10b line code). Such a high ratio between air bandwidth and optical bit rate is difficult to sustain at the high bandwidths introduced with the 5G mobile generation, especially considering that with CPRI the bit rate in the fibre is constant, independently of the presence of user data.

The CPRI consortium developed the eCPRI interface, which is a packet interface (thus, having a bit rate proportional to user data traffic), where the modulation symbols of the Optical Frequency Division Multiplexed (OFDM) air signal are transmitted instead of its time samples, leading to a remarkable saving of bandwidth. The exact value of bit rate depends on implementation details. The eCPRI frame format is compatible with the Ethernet standard to reuse as much as possible technologies developed in packet networks. Although the co-DBA techniques described earlier mitigates latency problems in CPRI (i.e. fronthaul deployments for LTE), it might not be sufficient to guarantee the low delay required by the eCPRI interface in 5G fronthaul deployments (<100 µs, one way).

Figure 2:
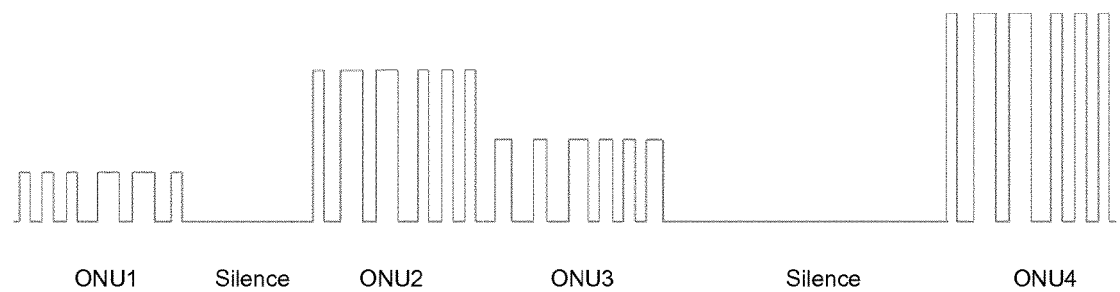
FIG. 2 is a diagram illustrating an example of a signal received by an OLT from four ONU devices.

Another issue is due to the bursty nature of the upstream PON signal, which may degrade the end to end performance of the mobile system. In a PON network, the ONUs are placed at different distances from the OLT. This means that the level of received power at the OLT varies, depending on which one of the ONUs is transmitting. Moreover, even if an ONU has been allowed to transmit by the OLT, it is not obliged to do so, meaning that silence periods can occur where no power is received by the OLT. FIG. 2 provides an example of a signal received by an OLT from four ONUs.

Optical receivers able to deal with fast changes of received power and to recover quickly clock and frame synchronization (even after a silence period), are called Burst Mode Receivers (BMR). However, although burst receivers operating at 25 Gbit/s, a bit rate that may be used by eCPRI, have been demonstrated they have not found commercial application, due to their high cost. The definition of traffic classes does not work in implementations in which we have only eCPRI RUs because all eCPRI RUs have equal priority.

To simplify description of embodiments it is assumed that there is one RU associated with each ONU. Adjustments would have to be introduced to accommodate more than one RU connected to one ONU. For example, if two RUs are connected to one ONU the length of the fibre would be the same for both RUs, but each RU would have its own mobile upstream data that would have to be transmitted to the OLT/BBU in accordance with their mobile scheduling. Further, the description covers the following scenarios: all RUs may be connected to the same BBU or BBU pool; all RUs may be connected to the same OLT but refer to independent BBUs or BBU pools; and finally, as above, but with RUs and BBUs belonging to different vendors.

Figure 3:
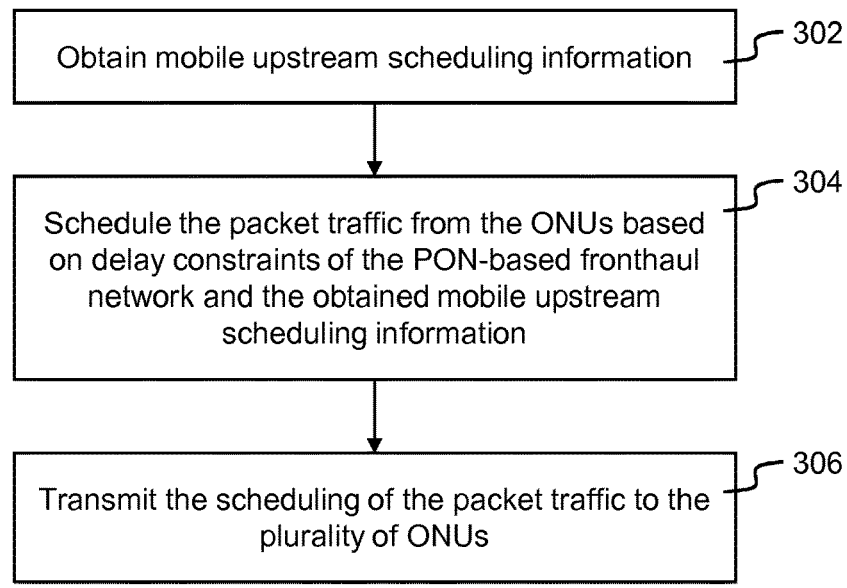
FIG. 3 is a diagram illustrating a method of controlling transmission of upstream packet traffic in a PON-based fronthaul network in one embodiment of the present invention.

A flow chart illustrating an embodiment of a method for controlling transmission of packet traffic in an upstream direction from a plurality of ONUs connected to an OLT in a PON-based fronthaul network in accordance with the present invention is presented in FIG. 3.

In a preferred embodiment the packet traffic is eCPRI traffic. Also preferably, a constant bit rate fronthaul traffic may be converted to eCPRI and low bit rate fronthaul clients may be multiplexed prior to the conversion to eCPRI to ensure bandwidth efficiency. Both conversion and multiplexing operations may to be performed by the RU and/or BBU.

The method, in the embodiment illustrated in FIG. 3 may be performed at the OLT, 102, or in a Baseband Unit, BBU, with embedded OLT function, 118, or in a separate controller, 120 (e.g. implemented in a cloud or alternatively a standalone controller). The ONUs, 104, transmit packets in a time division multiplexed access scheme to the OLT, 102. The method comprises a step of obtaining, 302, mobile upstream scheduling information. In a preferred embodiment the mobile upstream scheduling information is obtained from a Baseband Unit, BBU, 116, associated with the OLT. The mobile network, for example the BBU, 116, schedules transmission of the UEs (i.e. upstream transmission) at every transmission time interval in response to requests received from the UEs. This means the BBU, 116, knows the amount and timing of mobile traffic that each of the RUs, 114, is going to receive from the UEs they (i.e. the RUs) serve. This is the packet traffic which must be transmitted by the ONUs, 104, to the OLT, 102. In the next operation, the method in its preferred embodiment comprises scheduling, 304, the packet traffic from the plurality of ONUs, 104. This traffic carries the UE originated packets over the PON network from the ONUs, 104, via the ODN, 106, to the OLT, 102. The scheduling, 304, is based on delay constraints of the PON-based fronthaul network and the obtained mobile upstream scheduling information. The operation 304 takes into account the characteristics of the PON network (delay) as well as the mobile traffic the PON-based fronthaul network is expected to carry towards the OLT. This embodiment of the method adjusts the TDM scheme of the PON network to the requirements of the mobile upstream scheduling. Then the method comprises transmitting (306) the scheduling of the packet traffic to the ONUs. In this way the ONUs, 104, are informed when they are allowed to transmit to the OLT, 102 and the bandwidth available for this transmission.

Because all RUs have the same priority, with N active RUs the worst-case upstream delay, D, will be given by:

$$D = D_{fiber} + \sum_{n=1}^{N} P_n \cdot T_n \qquad \text{Equation 1}$$

where $D_{fiber}$ is the fiber propagation delay, $P_n$ is the packet size, in number of bits, as transmitted by the $n^{th}$ RU and $T_n$ the bit time (i.e. the inverse of the bit rate). It is worth noting that in TDM based PON networks the product $P_n \cdot T_n$ is in fact the length of a timeslot. This worst-case upstream delay is experienced in a situation when an ONU (e.g. ONU3, 104-3) receives data from its associated RU3, 114-3, immediately after the timeslot allocated to ONU3 finished or when the ONU3 still has unsent data in a buffer. This means that the ONU3 must wait for the next timeslot allocated to it (i.e. until all remaining ONUs use their allocated timeslots). We use in this equation N and not N−1 because time is also needed for the ONU3 to deliver the data to the OLT, 102, which adds to the worst-case upstream delay.

In one embodiment of the method, equation 1 is exploited to control the worst-case upstream delay. If, for one or more of the ONUs connected to the OLT, the value of D exceeds the latency tolerated by the fronthaul interface (first threshold, $TH_1$), the length of the timeslots allocated to the ONUs will be reduced until reaching the tolerated value of latency. Such reduction may be proportionally equal, for all connected ONUs, or differentiated depending on the carried service, such that in one embodiment it may be that only one ONU may have the length of timeslots allocated for upstream transmission reduced. The timeslot resizing operation may be performed periodically. This is possible because the RAN scheduler, a function performed by the BBU, 116, knows in advance the number N of active RUs and the packet sizes, based on the received grants request. It may be that with reduction of the number of active RUs (e.g. during night) it will be possible to increase the length of timeslots if the worst-case upstream delay drops below a second threshold, $TH_2$.

Figure 4:
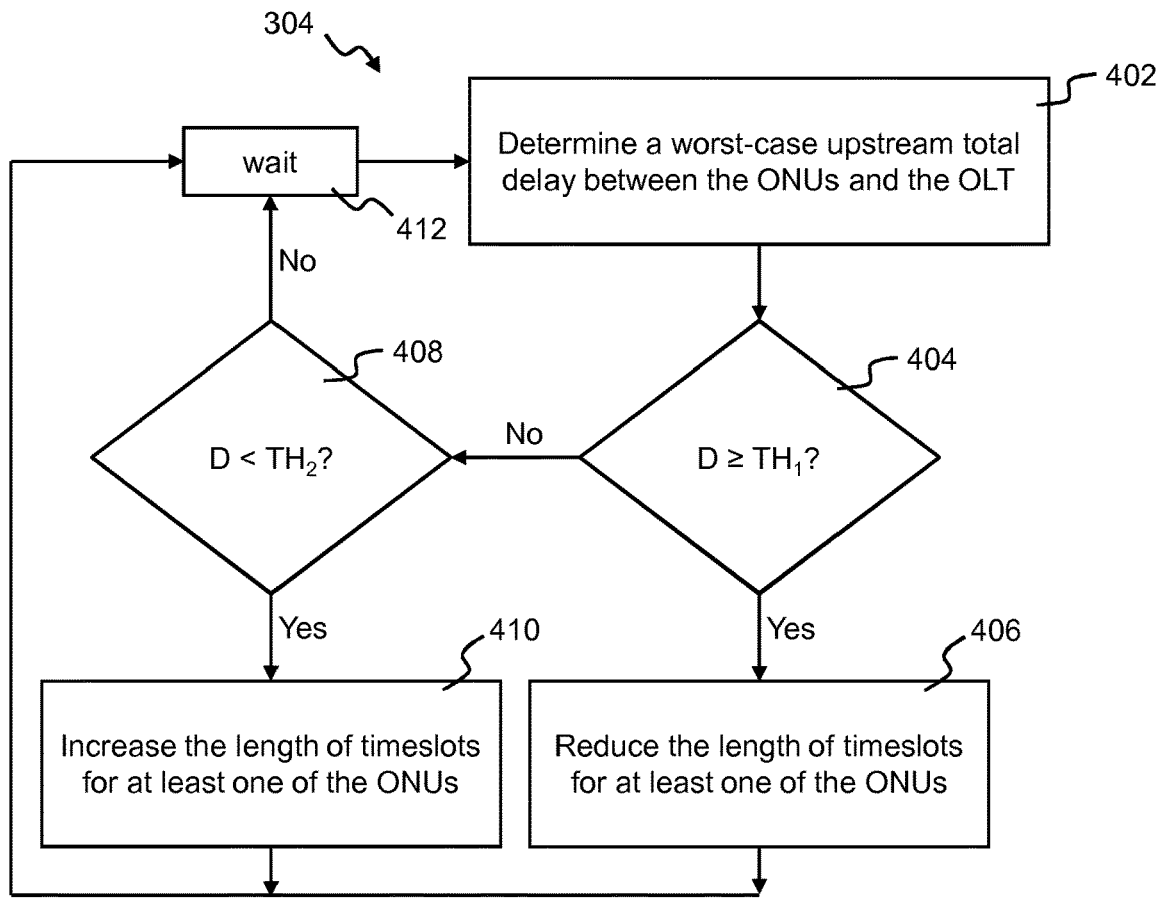
FIG. 4-FIG. 7 are diagrams illustrating further details of the method of controlling transmission of upstream packet traffic in a PON-based fronthaul network in one embodiment of the present invention.

In detail, as illustrated in FIG. 4, the embodiment of the method in the operation of scheduling, 304, the packet traffic comprises reducing, 406, the length of timeslots allocated to ONUs for transmission in the upstream direction. Preferably, the method comprises determining, 402, a worst-case upstream total delay (D) between the ONUs and the OLT. If the worst-case upstream total delay D is equal to or exceeds a first threshold, $TH_1$ (this is the maximum tolerated delay/latency), 404, the length of timeslots for at least one of the ONUs may be reduced, 406.

In one embodiment the length of timeslots may be reduced only for the ONUs, 104, having the upstream total delay equal to or exceeding the first threshold, $TH_1$. However, in an alternative embodiment the length of timeslots may be reduced for all ONUs, 104, connected to the OLT, 102. When the reduction of the length of timeslots is applied to more than one ONU then it may be applied in the same proportion to all ONUs irrespective of the service carried (e.g. timeslots for all ONUs may be reduced by 5%) or may be differentiated depending on the service carried by packets transmitted by the ONUs.

Because the mobile upstream scheduling information is known (it is obtained from the BBU, 116), it may be known that, for example RU2, 114-2, has less data to transmit in the upstream direction than the current bandwidth allocated to ONU2, 104-2, associated with RU2 (or that the RU2 does not have any data to transmit in the timeslot allocated to ONU2). In this situation, if the delay related to a different ONU, for example ONU4, 104-4, exceeds a predefined maximum tolerated delay, the PON scheduling information may be updated so that the transmission over the PON system reduces the delay for RU4, 114-4 by allocating part of the bandwidth not used by ONU2, 104-2, (and RU2) for transmission by ONU4, 104-4 (and its associated RU4). This assumes that the bandwidth allocated to ONU2, 104-2 (and its associated RU2) can be reduced. If this is not possible, then the bandwidth allocated to ONU4 (RU4) would need to be reduced as in the embodiments described above.

FIG. 4 also illustrates the embodiment in which the length of timeslots allocated to one or more ONU devices for transmission in upstream direction is increased. As mentioned above, this may happen in periods of reduced mobile traffic, e.g. overnight, when some of the RUs 114 may be switched off. If it turns that the worst-case upstream total delay D is above the first threshold, $TH_1$, 404-No, then a second check is performed in which the worst-case upstream total delay D is compared with a second threshold $TH_2$. If D is below $TH_2$, 408-Yes, the length of timeslots allocated to at least one ONU for transmission in upstream direction is increased.

Similar to the embodiment in which the timeslot length is reduced the operation of increasing the length of a timeslot may increase length of timeslots of all ONU devices proportionally or, in an alternative embodiment the length of a timeslot may be increased depending on service carried by packets transmitted by the ONUs, or, in yet another embodiment, the length of a timeslot may be increased for the ONUs having the upstream total delay below the second threshold, $TH_2$.

In one embodiment the thresholds $TH_1$ and $TH_2$ may be different to create hysteresis and avoid too frequent changes of the timeslot length, but in an alternative embodiment $TH_2$ may be equal to $TH_1$.

In a preferred embodiment the operations of calculating worst-case upstream total delay, 402, and reducing, 406, or increasing, 410, the length of timeslots are performed periodically. Length of the period, 412, is implementation specific.

Figure 1:
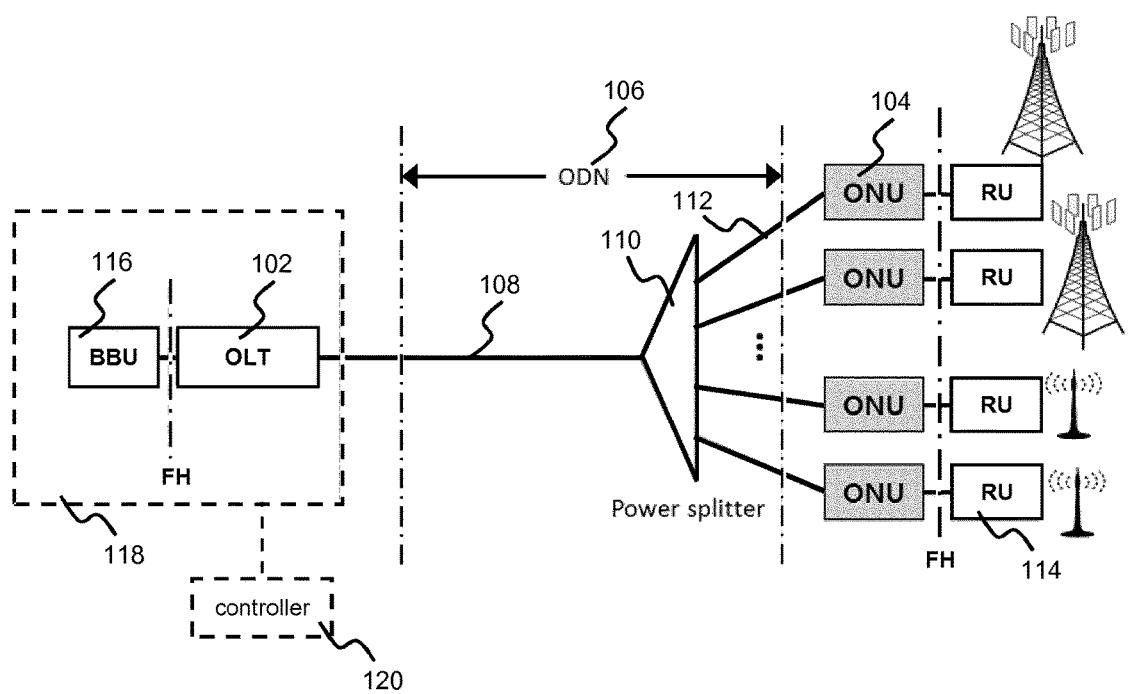
FIG. 1 is a diagram illustrating a PON-based fronthaul network.
Figure 10:
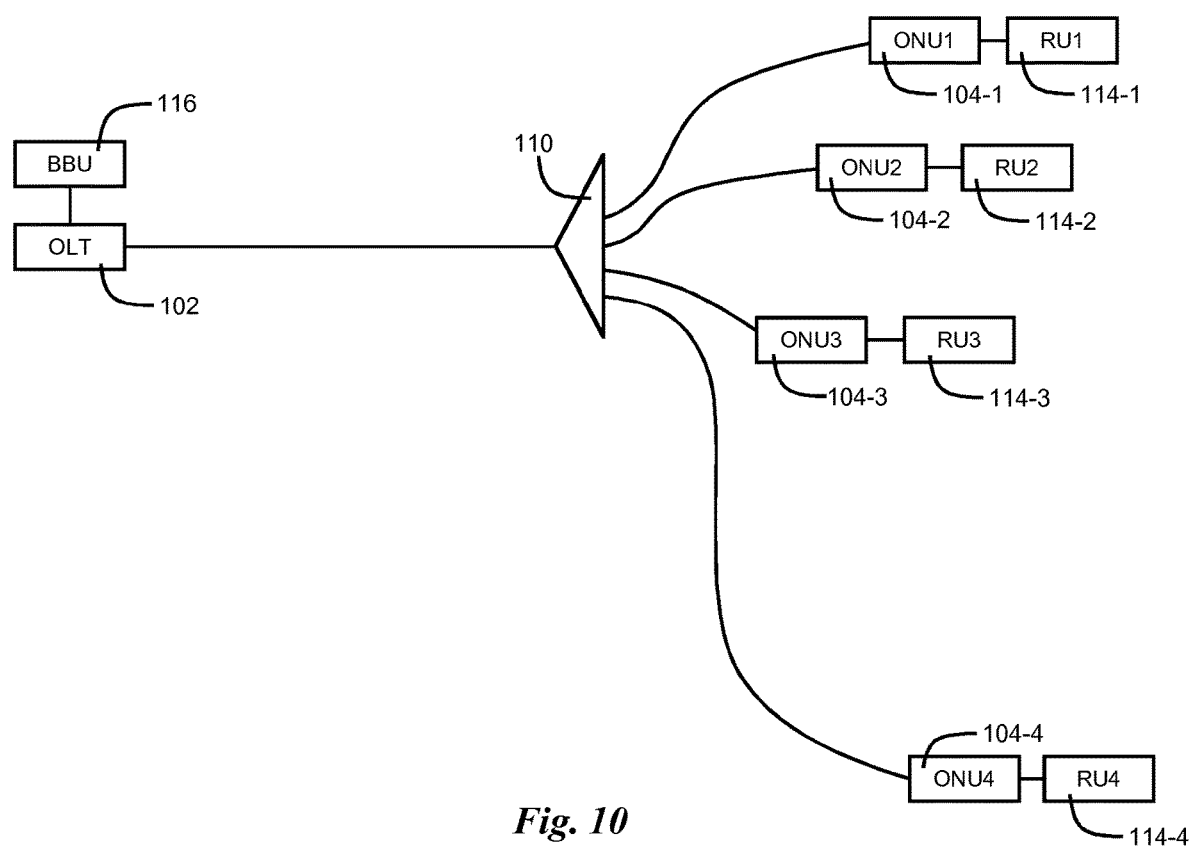
FIG. 10 is a diagram illustrating a PON-based fronthaul network with different lengths of optical fibres.

Equation 1 assumes that the fiber delay is equal for all RUs. This is not true in real systems due to the different length of the drop fibers as clearly shown in FIG. 10, which is a simplified version of FIG. 1.

Figure 5:
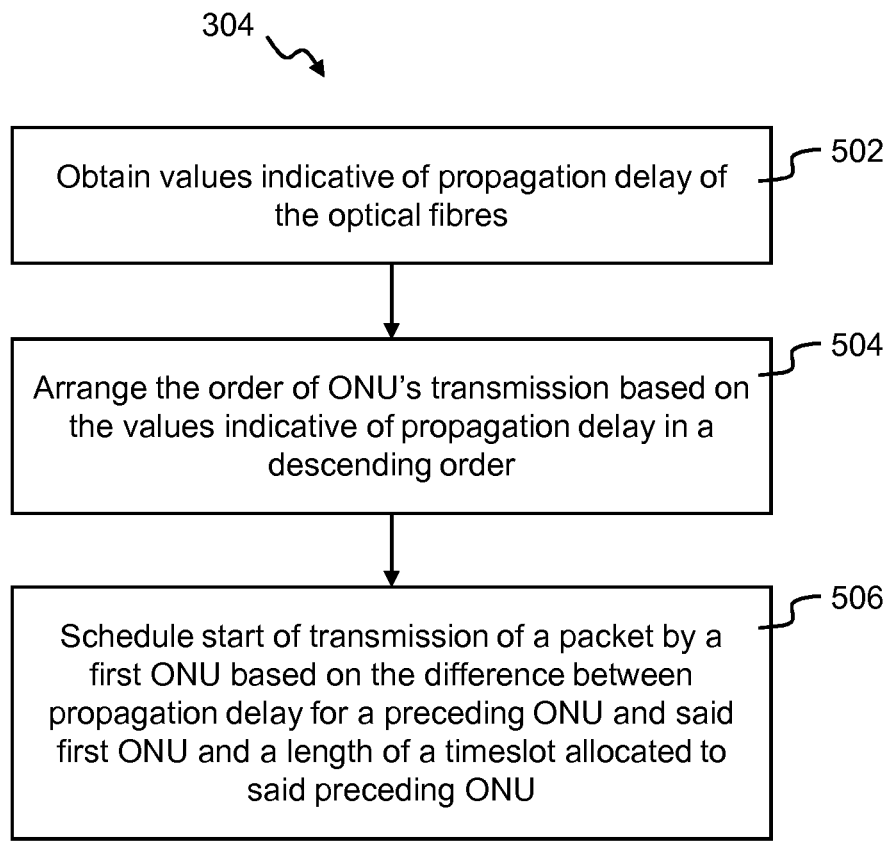

In one embodiment, illustrated in FIG. 5, the operation of scheduling the optical packet traffic, 304, comprises arranging, 504, the order in which the ONU devices, 104, transmit their packets based on values indicative of propagation delay, 502, of the optical fibres connecting the ONUs, 104, to the OLT device, 102 in a descending order. The ONU having the greatest propagation delay transmits first and the ONU having the lowest propagation delay transmits last. Preferably, the start of transmission, 506, of a packet by an ONU depends on the difference between propagation delay for a preceding ONU and said ONU and a length of a timeslot allocated to said preceding ONU.

The embodiments of the method illustrated in FIG. 5 are based on equalization of the delay. The fibre delay used in equation 1 may be known from design of the network (e.g. the length of the drop fibres may be known), or it may be estimated, for example using the method described in patent application WO2015/169363. The delay equalization is done by sorting the start-of-transmission times of the ONUs, 104, by experienced fiber delay, in descending order. Hence:

The ONU experiencing the greatest fibre delay ($D_1$) will transmit first, at the instant $t_1$;

The second ONU (fibre delay $D_2<D_1$), will start transmitting at the time $t_2=t_1+(D_1-D_2)+P_1T_1$;

The third ONU (fibre delay $D_3<D_2$) will start transmitting at the time $t_3=t_2+(D_2-D_3)+P_2T_2$;

. . . and so on.

The RAN and PON schedulers can be easily synchronized (i.e. start of the radio frame with a known relationship with the start of the GPON TDM frame). The required accuracy that can be achieved is well within the tolerance related to controlling of the delays. Time synchronization can be distributed between the BBU/OLT and the ONU/RU pairs for example via time synchronization mechanism as specified in G.984.3 (which is based on the ranging mechanism). The accuracy in this case can be typically controlled in the order of 100-200 ns. The OLT is operable to ensure that all RUs associated with ONUs connected to the OLT have the same timing reference synchronous with the Time Transmission Interval (TTI) of the mobile network. Such a timing reference may be provided by the BBU.

PON scheduling (also referred to as PON scheduling information) in a preferred embodiment may include timing for the packet traffic and/or power information associated with optical signals transmitted by the ONUs, 104. The PON scheduling information may include both timing and transmit power information or only one of these. For example, if the transmit power does not change then the PON scheduling information may include only the timing information. Conversely, if the timing does not change, but the requirements for the transmit power do change, then the PON scheduling information may include only the transmit power information. In yet another alternative embodiment the PON scheduling information may always include timing and transmit power information.

Figure 6:
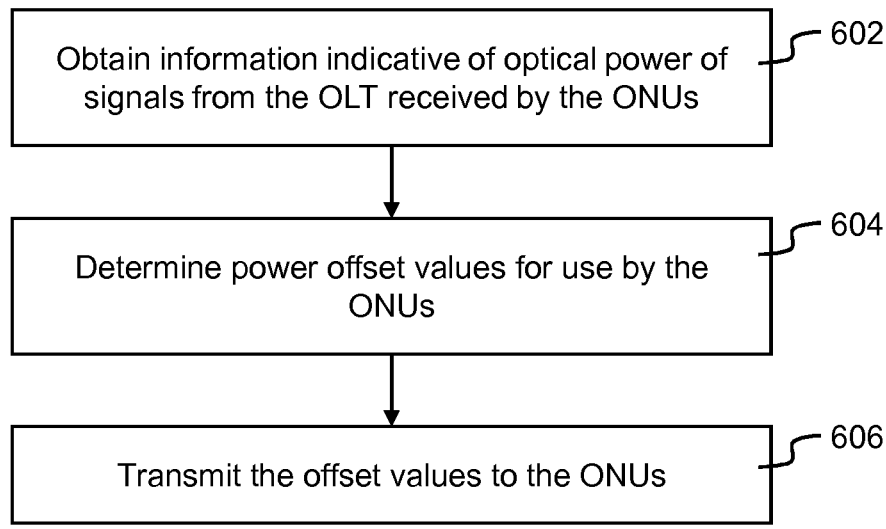

Another embodiment of the method of controlling transmission of the upstream packet traffic from the ONU devices, 104, to the OLT device, 102, deals with the bursty nature of the upstream PON signal described earlier and illustrated in FIG. 2. In this embodiment the ONUs are instructed to adjusting transmission power to equalize the differential loss. Since all the ONUs, 104, receive the same downstream signal it can be used a power reference. This can be seen in FIGS. 1 and 10 where the passive optical splitter, 110 splits the optical signal equally among all the fibres. An embodiment of power adjustment procedure is illustrated in FIG. 6 and comprises obtaining, 602, from the ONUs, 104, information indicative of values of optical power of signals from the OLT, 102, received by the ONUs. This is possible because the ONUs receive downstream signal from the OLT and communicate the value of received power to the OLT. All ONUs connected to the same OLT received the same signal hence the values indicative of optical power received from the ONUs also indicate the loss experienced by the optical along the fibre. The next step comprises determining, 604, based on the received values, power offset values for use by the ONUs when transmitting to the OLT to equalise optical power levels of the signals received at the OLT. Preferably, the OLT compares the received values indicative of optical power and estimates, for each ONU, the power offset. Then, the OLT sends, 606, these offset values to the ONUs. This embodiment relies on the fact that the loss is approximately equal in downstream and upstream directions. In one embodiment these offset values may be sent to the ONUs as part of the PON scheduling information.

In one embodiment the offset may be equal to the difference between the ONU received power and the minimum value of received power among all ONU devices. In this embodiment the ONU would reduce its optical transmit power by the received offset value. In this embodiment the power level of optical signals received by the OLT will be adjusted to the power level of the weakest optical signal.

In an alternative embodiment the offset may be equal to the difference between the ONU received power and the maximum value of received power among all ONU devices. In this embodiment the ONU would increase its optical transmit power by the received offset value. In this embodiment the power level of optical signals received by the OLT will be adjusted to the power level of the strongest optical signal.

If the power equalization is not perfect yet (i.e. optical power levels of the signals received at the OLT are not within a predefined range), e.g. due to different fibre attenuation at different wavelengths, it can be further refined. Since the OLT knows which ONU transmits on each upstream time slot, it can instruct the ONU transmitting in non-conforming timeslots a second offset value, based on a similar criterion, i.e. the difference between the detected power on that time slot and the minimum (or maximum) received power among all the time slots.

The embodiments disclosed above, which adjust packet size, order and start of transmission time based on number of active ONUs and relative propagation delay, should guarantee continuous upstream transmission, with no silent periods. The above power equalization further mitigates the bursty nature of the upstream traffic, relaxing the performance requirement of the BMR (Burst Mode Receiver) at the BBU. It may happen, however, that an RU (and in consequence its associated ONU) have been scheduled to transmit data in upstream direction but eventually there is no data to transmit and the ONU remains silent. These silent periods, as explained earlier, would require burst mode receivers operating at 25 Gbit/s of the eCPRI interface to recover from fast changes of received power, but the cost of such BMRs is prohibitive. Therefore, the method according to a preferred embodiment will ensure that there is always one transmitting ONU device, even in the absence, of user data.

Figure 7:
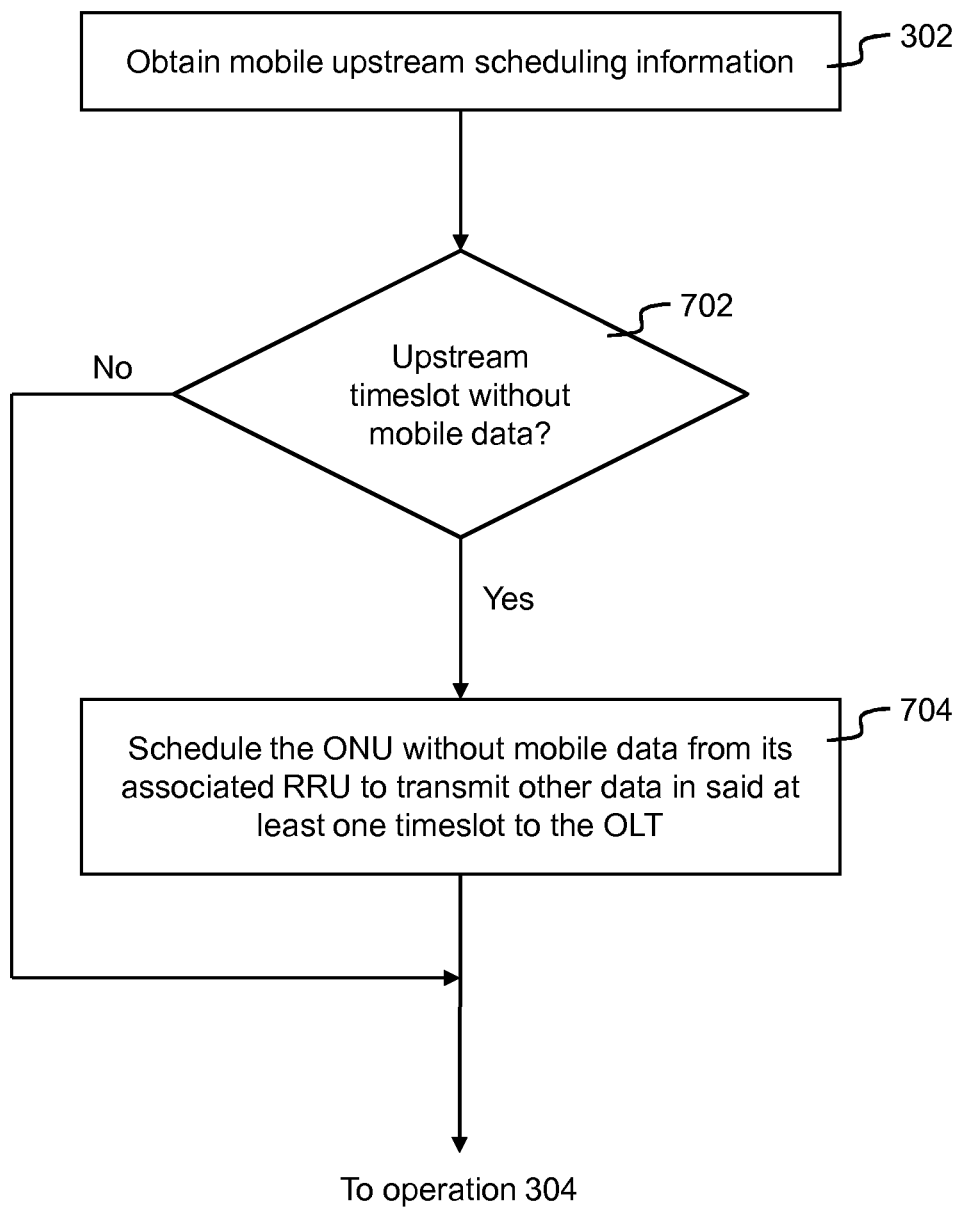

In this preferred embodiment, as illustrated in FIG. 7, if the BBU, 116, or the OLT, 102, determines, 702, from the mobile upstream scheduling information obtained in step 302 that there is at least one timeslot with no mobile upstream data to be transmitted by at least one ONU, the method comprises scheduling, 704, transmission of other data in said at least one timeslot. Other data here refers to data which is not received from the RU associated with said at least one ONU. This way the method avoids silent timeslots and allows for use of simpler and less expensive BMRs or in some embodiments allows for not using BMRs at all. If the system is capable to contain power fluctuations within approximately 1 dB, without silent periods, also regular receivers will work.

It is important that further advantages may be achieved in a preferred embodiment, in which the operation of scheduling, 704, comprises allocating said at least one timeslot for transmission of data by a different ONU whose delay exceeds a predefined maximum tolerated delay. The advantage is that by allocating such an additional timeslot to said different ONU the delay related to said different ONU may be reduced, even below the predefined maximum tolerated delay. This is the situation described earlier in which a delay related to a first ONU may be reduced if the first ONU is allowed to transmit during timeslot originally allocated to a second ONU if the second ONU does not need all the bandwidth originally assigned to it.

Alternatively, the operation of scheduling, 704, may comprise scheduling the at least one ONU device to transmit a predefined data pattern in said at least one timeslot. Preferably it would be the ONU, 104, associated with the RU, 114, that has no mobile data to transmit in upstream direction, but it may also be that another ONU is scheduled to transmit during said at least one timeslot.

The operation of scheduling 704 may be carried out as part of the operation of scheduling 304.

The advantages of the disclosed method include reduction of delay to keep it below the maximum tolerated value, but also helps to ensure that the PON delay is deterministic by avoiding the usual DBA grant processing time. Further, embodiments of the method ensure that the upstream transmission is continuous and the optical power received at the OLT is at a approximately constant level, which allows for relaxing technical requirements of the burst mode receiver, or even completely dispense with the BMRs.

Figure 8:
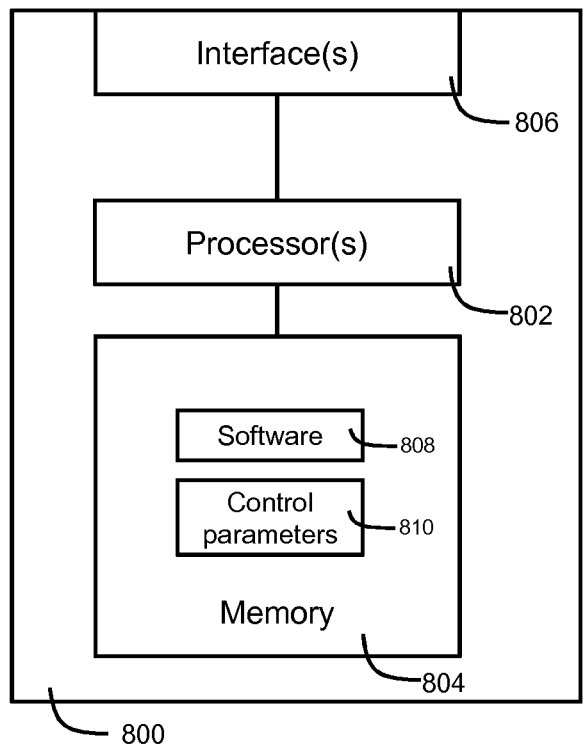
FIG. 8 is a diagram illustrating an apparatus for controlling transmission of upstream packet traffic in a PON-based fronthaul network in one embodiment of the present invention.

FIG. 8 illustrates one embodiment of an apparatus, 800, which implements the method of controlling transmission of upstream packet traffic from a plurality of Optical Network Units, ONUs, connected to an Optical Line Terminal, OLT, in a PON-based fronthaul network described earlier. The apparatus, 800, comprises a processing circuitry, 802, and a memory, 804. The memory, 804, contains instructions executable by the processing circuitry, 802, such that the apparatus, 800, is operative to obtain mobile upstream scheduling information, preferably from a Baseband Unit, BBU, 116, associated with the OLT, 102. Further the apparatus is operative to schedule the packet traffic from the plurality of ONU devices based on delay constraints of the PON-based fronthaul network and the obtained mobile upstream scheduling information and to transmit the scheduling of the packet traffic to the ONUs.

The apparatus, 800, may include a processing circuitry (one or more than one processor), 802, coupled to an interface, 806, and to the memory 804. The apparatus, 800, may comprise more than one interface. For example, one interface may a PON interface for connecting to the ONUs, 104, and another interface may be provided for the network operator to perform management operations on the apparatus 800. By way of example, the interface 806, the processor(s) 802, and the memory 804 may be connected in series as illustrated in FIG. 8. Alternatively, these components 802, 804 and 806 may be coupled to an internal bus system of the apparatus, 800. The memory 804 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory, 804, may include software, 808, and/or control parameters, 810. The memory, 804, may include suitably configured program code to be executed by the processor(s), 802, so as to implement the above-described method as explained in connection with FIGS. 3-7.

In one embodiment the apparatus, 800, comprises the OLT, 102, and in operation the OLT, 102, is connected to the BBU, 116. In this embodiment the OLT and BBU are separate devices. In an alternative embodiment the apparatus, 800, comprises the OLT and BBU embedded (integrated as a single device with BBU and OLT functions). Similarly, the ONU, 104 and the RU, 114, may be separate devices and in an alternative embodiment the ONU and RU may be integrated (embedded) as a single device with ONU and RU functions.

It is to be understood that the structures as illustrated in FIG. 8 are merely schematic and that the apparatus, 800, may actually include further components which, for the sake of clarity, have not been illustrated, e.g., further interfaces or processors. Also, it is to be understood that the memory, 804, may include further program code for implementing other and/or known functionalities.

According to some embodiments, also a computer program may be provided for implementing functionalities of the apparatus, 800, e.g., in the form of a physical medium storing the program code and/or other data to be stored in the memory 804, or by making the program code available for download or by streaming.

It is also to be understood that the apparatus, 800, may be provided as a virtual apparatus. In one embodiment, the apparatus, 800, may be provided in distributed resources, such as in cloud resources. When provided as virtual apparatus, it will be appreciated that the memory, 804, processing circuitry, 802, and physical interface(s), 806, may be provided as functional elements. The functional elements may be distributed in a logical network and not necessarily be directly physically connected. It is also to be understood that the apparatus, 800, may be provided as single-node devices, or as a multi-node system.

Figure 9:
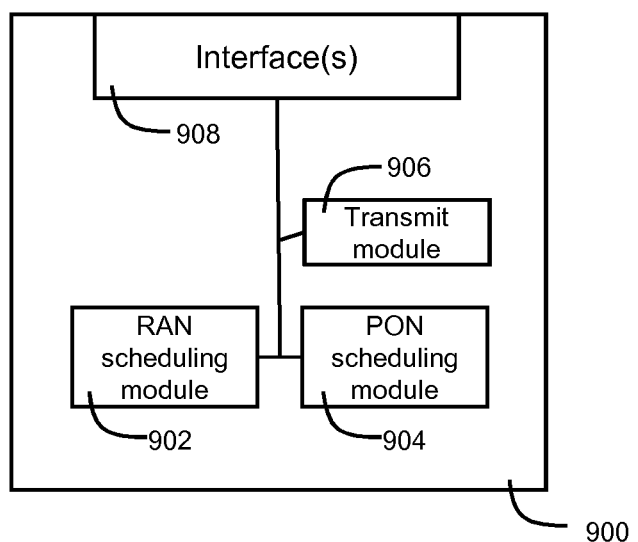
FIG. 9 is a diagram illustrating an apparatus for controlling transmission of upstream packet traffic in a PON-based fronthaul network in another embodiment of the present invention.

FIG. 9 illustrates an alternative embodiment of an apparatus, 900, which implements the method of controlling transmission of upstream packet traffic from a plurality of Optical Network Units connected to an Optical Line Terminal, OLT, in a PON-based fronthaul network described earlier. The apparatus, 900, comprises a RAN scheduling module, 902, operative to obtain mobile upstream scheduling information, (preferably from a Baseband Unit, BBU, 116, associated with the OLT, 102). Further the apparatus, 900, comprises a PON scheduling module, 904, to schedule the packet traffic from the plurality of ONU devices based on delay constraints of the PON-based fronthaul network and the obtained mobile upstream scheduling information. The apparatus, 900, also comprises a transmit module, 906, to transmit the scheduling of the packet traffic to the ONUs.

The apparatus, 900, may comprise one or more interface, 908. For example, one interface may a PON interface for connecting to the ONUs, 104, and another interface may be provided for the network operator to perform management operations on the apparatus 900. By way of example, the interface, 908, and the modules 902, 904 and 906 may be connected to a bus as illustrated in FIG. 9. Alternatively, these components 902, 904 and 906 and 908 may be connected in series.

The apparatus, 900, is operative to perform the method as explained in connection with FIGS. 3-7.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method of controlling transmission of an upstream packet traffic from a plurality of Optical Network Units, ONUs, connected to an Optical Line Terminal, OLT, in a Passive Optical Network, PON, based fronthaul network, wherein the plurality of ONUs transmit packets in a time division multiplexed access scheme to the OLT, the method comprising:
 obtaining mobile upstream scheduling information;
 scheduling the packet traffic from the plurality of ONUs based on delay constraints of the PON-based fronthaul network and the obtained mobile upstream scheduling information, wherein scheduling the packet traffic comprises arranging an order in which the plurality of ONUs transmit their packets based on values indicative of propagation delay of optical fibers connecting the plurality of ONUs to the OLT in a descending order, wherein start of transmission of a packet by a first ONU depends on a difference between propagation delay for a preceding ONU and the first ONU and a length of a timeslot allocated to the preceding ONU; and
 transmitting the scheduling of the packet traffic to the plurality of ONUs.

2. The method according to claim 1, wherein the mobile upstream scheduling information is obtained from a Baseband Unit, BBU, associated with the OLT.

3. The method according to claim 1, wherein scheduling the packet traffic comprises reducing a length of timeslots allocated to ONUs of the plurality of ONUs for transmission in upstream direction.

4. The method according to claim 3, comprising:
 determining a worst-case upstream total delay between the plurality of ONUs and the OLT;
 if the worst-case upstream total delay is equal to or exceeds a first threshold the method comprises reducing the length of timeslots for at least one of the ONUs of the plurality of ONUS.

5. The method according to claim 1, wherein scheduling the packet traffic comprises increasing length of timeslots allocated to ONUs of the plurality of ONUs for transmission in upstream direction.

6. The method according to claim 1 comprising:
 obtaining from the plurality of ONUs information indicative of values of optical power of signals from the OLT received by the plurality of ONUs;
 determining, based on the received values, power offset values for use by the ONUs when transmitting to the OLT to equalise optical power levels of the signals received at the OLT;
 transmitting the offset values to the ONUs.

7. The method according to claim 1, wherein if a baseband unit or the OLT determines from the mobile upstream scheduling information that there is at least one timeslot with no mobile upstream data to be transmitted by at least one ONU of the plurality of ONUs from a Remote Unit, RU, associated with the at least one ONU, the method comprises scheduling transmission of data in said at least one timeslot.

8. An apparatus for controlling transmission of an upstream packet traffic from a plurality of Optical Network Units, ONUs, connected to an Optical Line Terminal, OLT, in a Passive Optical Network, PON, based fronthaul network, wherein the plurality of ONUs transmit packets in a time division multiplexed access scheme to the OLT, the apparatus comprising a processing circuitry and a memory, the memory containing instructions executable by the processing circuitry such that the apparatus is operative to:
obtain mobile upstream scheduling information;
schedule the packet traffic from the plurality of ONUs based on delay constraints of the PON-based fronthaul network and the obtained mobile upstream scheduling information, wherein scheduling the packet traffic comprises arranging an order in which the plurality of ONUs transmit their packets based on values indicative of propagation delay of optical fibers connecting the plurality of ONUs to the OLT in a descending order, wherein start of transmission of a packet by a first ONU depends on a difference between propagation delay for a preceding ONU and the first ONU and a length of a timeslot allocated to the preceding ONU; and
transmit the scheduling of the packet traffic to the ONUs.

9. The apparatus according to claim 8, wherein to schedule the packet traffic the apparatus is operative to reduce length of timeslots allocated to ONUs of the plurality of ONUs for transmission in upstream direction.

10. The apparatus according to claim 9 operative to:
determine a worst-case upstream total delay between the plurality of ONUs and the OLT;
if the worst-case upstream total delay is equal to or exceeds a first threshold the apparatus is operative to reduce the length of timeslots for at least one of the ONUs of the plurality of ONUs.

11. The apparatus according to claim 9 operative to reduce length of timeslots depending on service carried by packets transmitted by the plurality of ONUs.

12. The apparatus according to claim 8 operative to increase length of timeslots allocated to ONUs of the plurality of ONUs for transmission in upstream direction.

13. The apparatus according to claim 12 operative to:
determine a worst-case upstream total delay between the plurality of ONUs and the OLT;
if the worst-case upstream total delay is below a second threshold the apparatus is operative to increase the length of timeslots for at least one of the ONUs of the plurality of ONUs.

14. The apparatus according to claim 12 operative to increase length of timeslots depending on service carried by packets transmitted by the plurality of ONUs.

15. The apparatus according to claim 12 operative to increase length of timeslots for the ONUs of the plurality of ONUs having the upstream total delay below the second threshold.

16. The apparatus according to claim 8 operative to:
obtain from the plurality of ONUs information indicative of values of optical power of signals from the OLT received by the plurality of ONUs;
determine, based on the received values, power offset values for use by the plurality of ONUs when transmitting to the OLT to equalise optical power levels of the signals received at the OLT;
transmit the offset values to the ONUs.

17. The apparatus according to claim 8, wherein if a baseband unit or the OLT determines from the mobile upstream scheduling information that there is at least one timeslot with no mobile upstream data to be transmitted by at least one ONU of the plurality of ONUs from a Remote Unit, RU, associated with the at least one ONU, the apparatus is operative to schedule transmission of data in said at least one timeslot.

18. The apparatus according to claim 17 operative to allocate said at least one timeslot for transmission of data by a different ONU whose delay exceeds a predefined maximum tolerated delay.

19. The apparatus according to claim 8 comprising the OLT and a baseband unit.

* * * * *